(12) United States Patent  
Prevot et al.

(10) Patent No.: US 8,336,172 B2
(45) Date of Patent: Dec. 25, 2012

(54) CLAMPING COLLAR

(75) Inventors: Fabrice Prevot, Selles-sur-cher (FR); Jérôme Jaffre, Chaumont sur Tharonne (FR); Nicolas Rigollet, Romorantin (FR)

(73) Assignee: Etablissements Caillau, Moulineaux (FR)

( * ) Notice: Subject to any disclaimer, the term of this patent is extended or adjusted under 35 U.S.C. 154(b) by 609 days.

(21) Appl. No.: 12/303,892

(22) PCT Filed: Jun. 8, 2007

(86) PCT No.: PCT/FR2007/051393
§ 371 (c)(1),
(2), (4) Date: Dec. 8, 2008

(87) PCT Pub. No.: WO2008/006990
PCT Pub. Date: Jan. 17, 2008

(65) Prior Publication Data
US 2010/0223764 A1    Sep. 9, 2010

(30) Foreign Application Priority Data

Jun. 9, 2006   (FR) ..................... 06 52086

(51) Int. Cl.
*F16B 33/02* (2006.01)
*F16B 33/04* (2006.01)
(52) U.S. Cl. ..................................... 24/279
(58) Field of Classification Search .......... 24/279, 24/280, 201 S, 20 CW, 580.11, 20 R; 138/99; 285/148.26
See application file for complete search history.

(56) References Cited

U.S. PATENT DOCUMENTS

| 1,584,498 | A |   | 5/1926  | Vitek |
| 1,596,944 | A | * | 8/1926  | Philbrook ....................... 24/285 |
| 2,213,022 | A | * | 8/1940  | Stauffer ........................ 138/99 |
| 2,278,714 | A | * | 4/1942  | Stauffer ........................ 138/99 |
| 4,195,444 | A | * | 4/1980  | Cote ............................ 49/403 |
| 4,299,012 | A | * | 11/1981 | Oetiker ........................... 24/19 |
| 4,521,940 | A |   | 6/1985  | Oetiker |
| 6,490,765 | B2 | * | 12/2002 | Anthes et al. .................. 24/279 |
| 6,519,815 | B2 | * | 2/2003  | Cassel et al. ................... 24/279 |
| 7,475,919 | B2 | * | 1/2009  | Hiernard et al. .............. 285/419 |
| 2002/0038495 | A1 |  | 4/2002 | Anthes et al. |
| 2008/0040897 | A1 | * | 2/2008 | Schaub ........................ 24/20 R |

FOREIGN PATENT DOCUMENTS

| CH | 234172 | A | 9/1944 |
| DE | 744975 | C | 2/1944 |
| DE | 1717978 | U | 3/1956 |
| DE | 3926626 | A1 | 10/1990 |
| EP | 1195531 | A1 | 4/2002 |
| FR | 896003 | A | 2/1945 |
| FR | 2522086 | A | 8/1983 |
| GB | 592211 | A | 9/1947 |

* cited by examiner

*Primary Examiner* — Robert J Sandy
*Assistant Examiner* — Matthew Sullivan
(74) *Attorney, Agent, or Firm* — The Webb Law Firm

(57) ABSTRACT

A clamping collar including: a belt comprising a strip and two free ends, each of said the ends being curved back to form a loop and each loop being defined by an outer belt portion and by an underlying inner belt portion; and a tightening system suitable for bringing the loops closer together and for tightening the belt; and in which each of ends of the belt is curved back towards the inside of the collar, the inner belt portion being extended beyond the loop, under the strip, and the outer belt portion presenting a tightening wall with which the tightening system, comes into engagement.

11 Claims, 5 Drawing Sheets

CLAMPING COLLAR

BACKGROUND OF THE INVENTION

The invention relates to a clamping collar.

Such a collar can be used to connect pipes, in particular in the automobile industry or in the aircraft industry (e.g. to connect pipes of the exhaust system or of the system for depolluting combustion gases).

More particularly, the invention relates to a clamping collar of the type comprising:
- a belt comprising a strip and two free ends, at least one of said free ends being curved back to form a loop, said loop being defined by an outer belt portion and by an underlying inner belt portion; and
- a tightening system suitable for co-operating with said loop so as to tighten said belt.

Generally, both of the free ends of said belt are curved back so as to form respective loops, and said tightening system makes it possible bring said loops closer together for tightening said belt.

DE 3926626 A1 describes a connection for pipes with two clamping collars of this type. Each of the collars is such that the ends of the belt are curved back towards the outside of the collar, and are then welded or otherwise bonded to the outside face of the strip of the belt, so as to form loops. In addition, each collar has a tightening system with two cylindrical retaining pieces that are received inside respective ones of the two loops of the collar. Such retaining pieces can be referred to as "blocks" or as "gudgeons".

The first block is provided with a tapped through hole and the second block is provided with a smooth through hole. The tightening system further comprises a screw having a threaded shank and a screw head. Each loop of the collar is provided two openings that are in register with each other so that the shank of the screw passes through each of the two loops. In addition, the shank of the screw passes freely through the smooth hole and engages in the tapped hole. While the screw is being screwed into the first block, the screw head comes into engagement with the second block which then pushes against the inner belt portion of one loop, while the first block pushes against the inner belt portion of the other loop. The collar is thus tightened by bringing said loops closer together.

An object of the invention is to propose a clamping collar of the above-mentioned type that is not provided with any blocks, so as to limit the number of parts of the collar and, also, so as to simplify assembly thereof, and/or so as to reduce the manufacturing cost thereof, while also maintaining good clamping performance.

This object is achieved by a clamping collar of the above-mentioned type in which at least one free end of the belt that forms a loop is curved back towards the inside of the collar, in which the inner belt portion of the loop is extended beyond the loop, under said strip, and in which the outer belt portion of each loop presents a tightening wall with which the tightening system comes into engagement.

Since the tightening system comes into engagement with the tightening wall of the outer belt portion, it is not necessary for a block to be present inside each loop.

In addition, with the collar of the invention, and unlike with the collar of DE 3926626 A1, the forces exerted on the loop by the tightening system are no longer exerted on the inner belt portion, via the inside of the loop, but rather they are exerted on the outer belt portion, via the outside of the loop. In order to take account of this new distribution of the forces, the ends are curved back towards the inside of the collar so that the strip of the belt is extended via the outer belt portion (rather than via the inner belt portion as in DE 3926626 A1).

Advantageously, in order to simplify manufacturing of the collar and, in particular, so as not to have to perform welding or other bonding operations, said inner belt portion is not fastened under said strip.

This is possible firstly because the tightening forces are exerted on the outer belt portion of the loop and secondly because said inner belt portion is held stationary by being compressed between the article to be clamped and the strip that covers said inner belt portion. While the collar is being tightened, friction forces are generated between the article to be clamped, said inner belt portion, and the strip. Said friction forces can be sufficient to prevent any movement of the inner belt portion and thus to oppose deformation (flattening) of the loop.

However, if said friction forces are insufficient, an abutment is provided for preventing the inner belt portion from moving along the strip (i.e. in the circumferential direction of the belt) while the collar is being tightened. In a simple embodiment, said abutment is formed by a shoulder against which said inner belt portion comes into abutment, while the collar is being tightened. In addition, a shoulder of height substantially equal to the thickness of the inner belt portion makes it possible to guarantee that the clamping outline of the collar is continuous.

Naturally, it is possible to imagine other types of abutments, e.g. a lug or a rib projecting from the inside face of the strip, or indeed a lug or a rib integral with the inner belt portion, projecting into the loop and coming into abutment against the base of the outer belt portion.

BRIEF DESCRIPTION OF THE DRAWINGS

The invention and its advantages can be better understood on reading the following detailed description of examples of collars of the invention. This description refers to the accompanying figures, in which.

DESCRIPTION OF THE PREFERRED EMBODIMENTS

Figure 1:
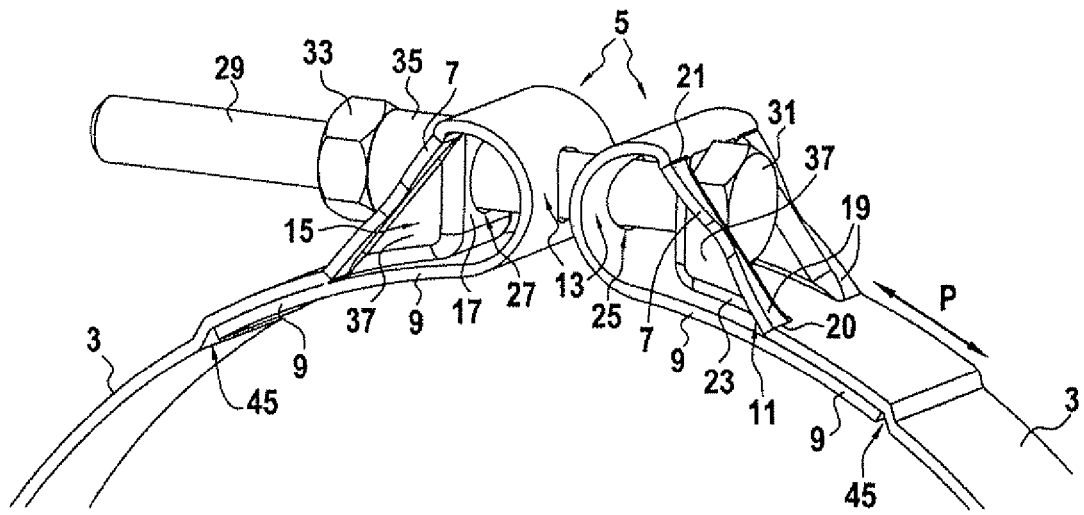
FIGS. 1 and 2 show a first example of a collar.

The examples of collars shown in the figures present numerous common characteristics. These common characteristics are described below and are referenced in the figures by like numerical references.

Each clamping collar comprises a belt comprising a strip 3 and two free ends. Each of the free ends is curved back towards the inside of the collar in such a manner as to form a loop 5. Each loop 5 is thus defined by an outer belt portion 7 that extends the strip 3 and by an underlying inner belt portion 9 that comes back under the strip 3. Said inner belt portion is extended beyond the loop 5, under a portion P of the strip 3. Along the strip portion P, the collar thus has two strip thicknesses.

The inner belt portion 9 is not fastened (it is not welded, or adhesively bonded, or riveted, etc.) to the strip 3. In other words, the inner belt portion 9 is in free contact with the strip 3 and only the stiffness of the loop 5 prevents the inner belt portion 9 from being moved away from the strip portion P.

Advantageously, the inside face of the strip 3 presents a shoulder 45 immediately upstream from the strip portion P. In the present Application, "upstream" and "downstream" are defined relative to the direction of the force exerted by the tightening system on the loop in question.

Seen from the inside of the collar, and looking along the strip 3 from downstream to upstream, the shoulder 45 forms an upward step. Thus, the inner belt portion 9 comes into abutment against said shoulder 45, while the collar is being tightened. In addition, the height of the shoulder 45 is at least substantially equal to the thickness of the inner belt portion 9 so that said inner belt portion does not project relative to the inside face of the strip 3. If the inner belt portion 9 were to project, it might damage the article to be clamped. In the examples, the height of the shoulder 45 is substantially equal to the thickness of the inner belt portion 9, thereby making it possible to obtain a belt having a continuous clamping outline.

This shoulder can be formed in various different manners. In FIGS. 1 to 8, it is formed by die-stamping the strip 3. In FIG. 9, it is formed by fastening the loops 5 to a main strip portion 3a.

The base 11 of the loop 5 is defined as being that zone of the loop that is closer to the strip 3, and the end 13 of the loop 5 is defined as being the zone of the loop that is opposite from said base 11 (i.e. the zone that is further from the strip 3). The inner belt portion 9 extends beyond the base 11 of the loop 5, upstream therefrom.

When the collar is in the position in which it is tightened to the maximum extent, the space between the ends 13 of the loops 5 is at its minimum.

Each collar further comprises a tightening system that is described further on in the description below.

The outer belt portion 7 has a pushed-in portion 15 that is set back relative to the outer outline of the loop 5. Said pushed-in portion defines a tightening wall 17 against which the tightening system comes to bear. In addition, the pushed-in portion is flanked on either side by respective ones of two edge segments 19 of the outer belt portion 7.

Each edge segment is substantially rectilinear and connects a first point 20 of the outer belt portion that is situated immediately upstream from the pushed-in portion 15 to a second point 21 of the outer belt portion that is situated immediately downstream from the pushed-in portion 15. The first point 20 is generally close to the base 11 of the loop, and, advantageously, at said base 11. The edge segment 19 acts mechanically as a stay that is tensioned between the portion upstream from the pushed-in portion 15 and the portion downstream therefrom, and retains the portion of the loop 5 that is situated downstream from the tightening wall 17 in order to prevent the downstream portion of the loop from deforming during the tightening.

The examples of clamping collars that are shown are of generally circular section. The tightening wall 17 then advantageously extends substantially radially, while the edge segments 19 form an angle A greater than 30° relative to a radius of the collar. The larger the angle A, the better the portion of the loop that is situated downstream from the tightening wall 17 is retained by the edge segments 13.

The tightening wall 17 is substantially plane. The pushed-in portion 15 optionally has another substantially plane wall 23 that faces the tightening wall 17 and forms a non-zero angle relative thereto. The walls 17 and 23 form the end wall of the pushed-in portion 15.

In the examples, the wall 23 bears against the inner belt portion 9. Since the tightening wall 17 extends substantially radially, the angle formed between the walls 17 and 23 is thus close to 90° (the larger the radius of the collar, the closer the angle is to) 90°. When the wall 23 bears against the inner belt portion 9, it acts as a shoe for causing the radial forces that are exerted by the tightening system to be distributed over the inner belt portion 9. Then, the inner belt portion 9 in turn distributes said radial forces over the article to be tightened.

In another aspect of the collars of the invention, each loop 5 presents two openings 25 and 27 that are in register with each other. The first opening 27 is provided in the tightening wall 17. The second opening 25 is provided at the end 13 of the loop 5. In addition, the collar tightening system (described below) includes a shank 29 suitable for being engaged in the openings 25 and 27, so as to pass through each of the loops 5.

When the same collar is to be used for articles to be clamped that are of different diameters, it must be possible for the shank 29 of the tightening system to move radially relative to the ends 13 of the loops 5. In order to allow such a radial movement to take place, the two openings 25 are oblong, with their long dimensions extending radially (see FIGS. 5 to 8). If necessary, the first openings 27 can also be oblong.

A description follows of the tightening system that is used for all of the collars shown. It can be noted that other systems can be used, provided that they come into engagement against the tightening walls 17 and that they make it possible to bring the loops 5 closer together.

The tightening system considered comprises a nut-and-bolt assembly comprising a bolt with a threaded shank 29 and a bolt head 31, a nut 33, and a spacer 35 which, in this example, is sleeve-shaped. The diameter of the bolt is chosen such that said bolt can pass through the openings 27. Conversely, the diameter of the bolt head 31 and the diameter of the spacer 35 are chosen such that said bolt head and said spacer cannot pass through the openings 27. In the example, the spacer 35 is disposed between the nut 33 and the belt, but it could be disposed between the bolt head 31 and the belt. In addition, the spacer 35 can be either distinct from or else integral with or secured to the nut 33 or the bolt head 31.

Thus, the bolt head 31 and the nut 33, via the spacer 35, come into engagement against the tightening walls 17 of the loops 5. The spacer 35 is used for keeping the nut 33 or the bolt head out of the pushed-in portion 15, thereby enabling said nut to be driven easily using a tool. Naturally, the presence of the spacer 35 is optional. For example, no spacer 35 is necessary when the pushed-in portion 15 is wide enough to enable the nut 33 (or the bolt head 31) to be driven, or when the nut (or the bolt head) is long enough and projects from the pushed-in portion 15.

In addition, it is noted that the shape and the dimensions of the pushed-in portion 15 are advantageously chosen so as to prevent the bolt head 31 or the nut 31 from moving in rotation. Thus, it is not necessary to hold the bolt head or the nut, while the nut-and-bolt assembly is being tightened.

A description follows of the features of each of the examples of collars shown in FIGS. 1 to 7.

Figure 2:
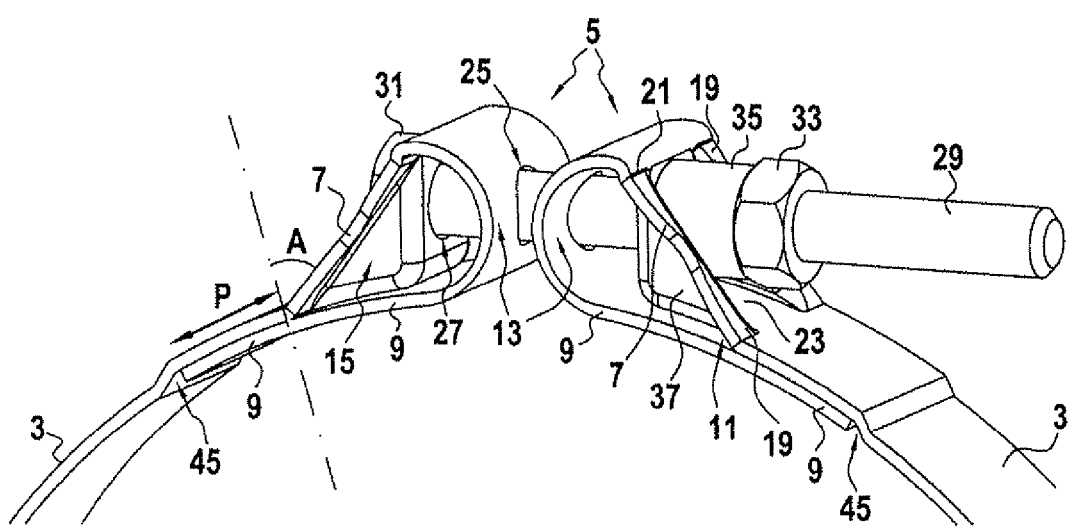

The first example of a collar shown in FIGS. 1 and 2 is such that the pushed-in portion 15 presents two side walls 37 that connect to the edge segments 19. Said side walls 37 thus extend between the walls 17 and 23 that form the end-wall of the pushed-in portion 15, and the edge segments 19 situated at the surface of the pushed-in portion 15 and on either side thereof.

In practice, the pushed-in portion 15 is formed by die-stamping the outer belt portion 7.

Figure 3:
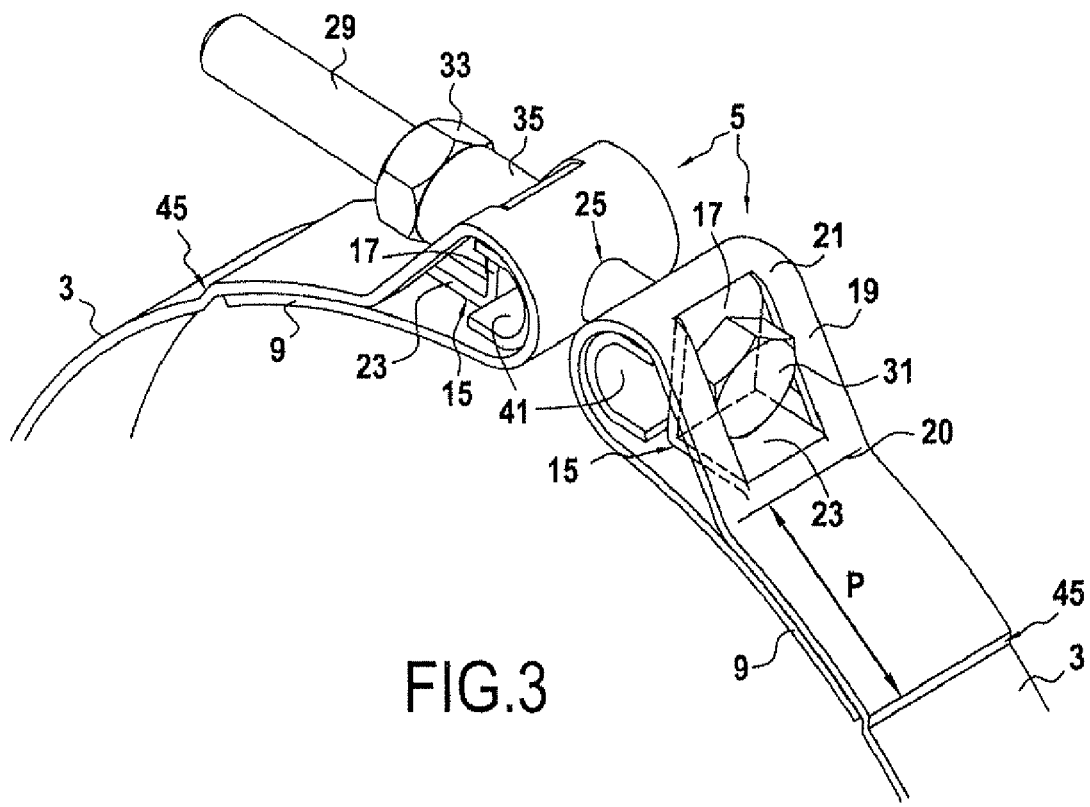
FIG. 3 shows a second example of a collar.

The second example of a collar shown in FIG. 3 is such that the pushed-in portion 15 is cut out from the outer belt portion 7 so as to be separate from the edge segments 19. This collar is thus not provided with side walls 37 and has recesses in their stead. The cuts made are thus side cuts only, along the edge segments 19, so that the pushed-in portion 15 presents an end wall, formed by the walls 17 and 23, and that is connected to the remainder of the outer belt portion 7 via its upstream edge and via its downstream edge.

In practice, the pushed-in portion 15 is formed by die-stamping the outer belt portion 7.

The collar of FIG. 3 further comprises reinforcing inserts 41. Each insert 41 is placed in the space provided inside the loop 5, between the tightening wall 17 and the end 13 of the loop 5, and it matches the inner outline of said space.

Said inserts 41 oppose deformation (flattening) of the loops 5 under the action of the tightening means. The tightening system does not come into engagement against said inserts 41, which are thus not comparable to the blocks of the prior art.

Unlike the blocks of the prior art, the inserts 41 do not need to be parts that (usually by being solid) are sufficiently rigid to transmit the tightening forces. Thus, in the example, the inserts 41 are made by cutting and shaping a metal strip. Advantageously, the strip is the same as the strip used for the collar, so that the cost of manufacturing the collar remains limited.

In the example, each insert 41 is trough-shaped with its end-wall being placed against the end 13 of the loop 5 and with its free ends being placed against the tightening wall 17.

Figure 4:
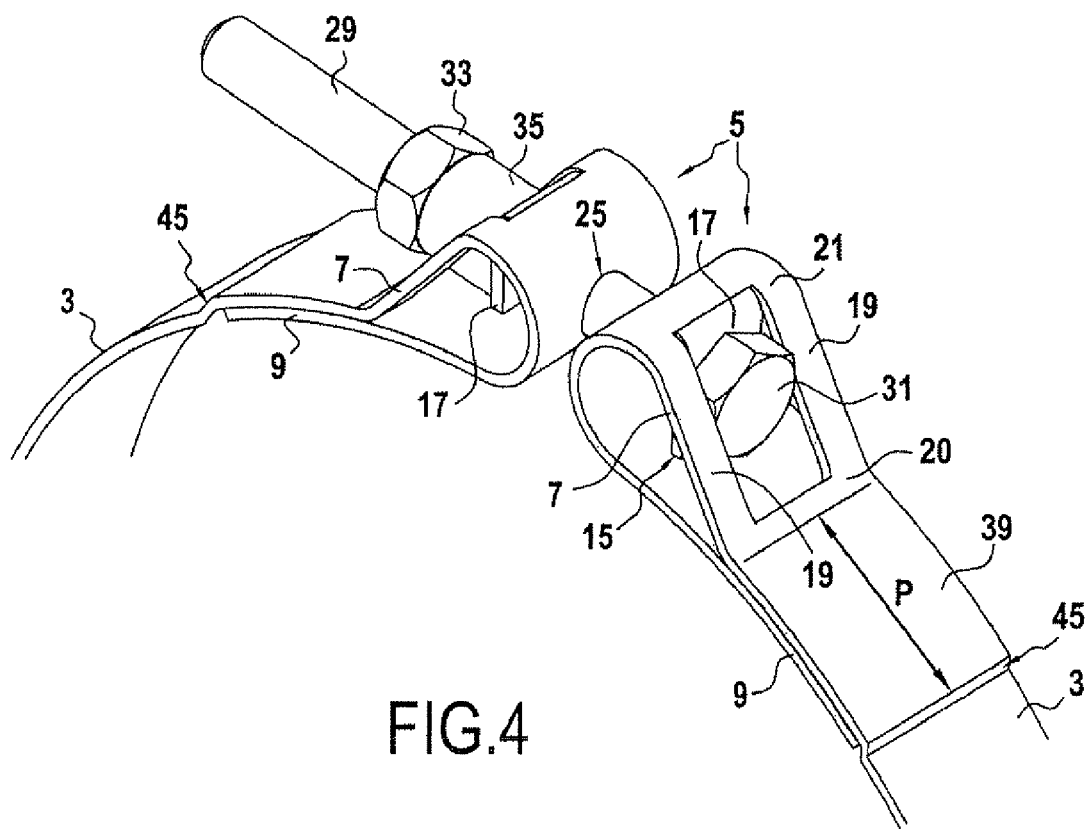
FIG. 4 shows a third example of a collar.

The third example of a collar, shown in FIG. 4, is analogous to the example shown in FIG. 3, except for the following differences only:

in order to form the pushed-in portion 15, a tongue is cut out from the outer belt portion, and said tongue is pushed in so that it forms the tightening wall 17; the pushed-in portion 15 has an end-wall formed by the tightening wall 17 only (it does not have a wall 23), which tightening wall is connected to the remainder of the outer band portion 7 via its downstream edge only; and the collar of FIG. 4 does not have an insert 41.

It should be noted that the belt of the collar of FIG. 4 must be sufficiently rigid at the tongue 17 for said tongue not to be pushed further into the loop 5 during tightening.

Figure 5:
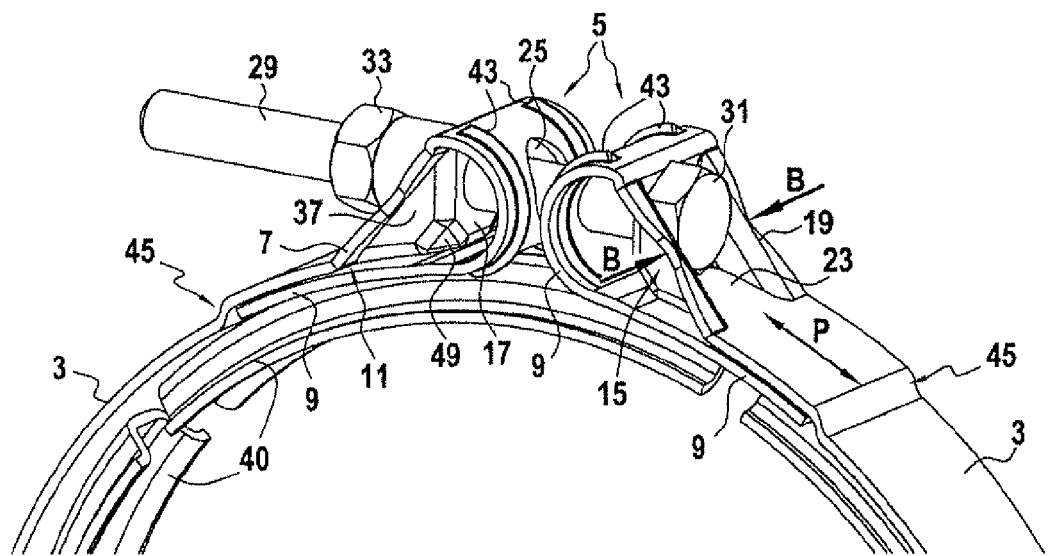
FIGS. 5 and 6 show a fourth example of a collar.
Figure 6:
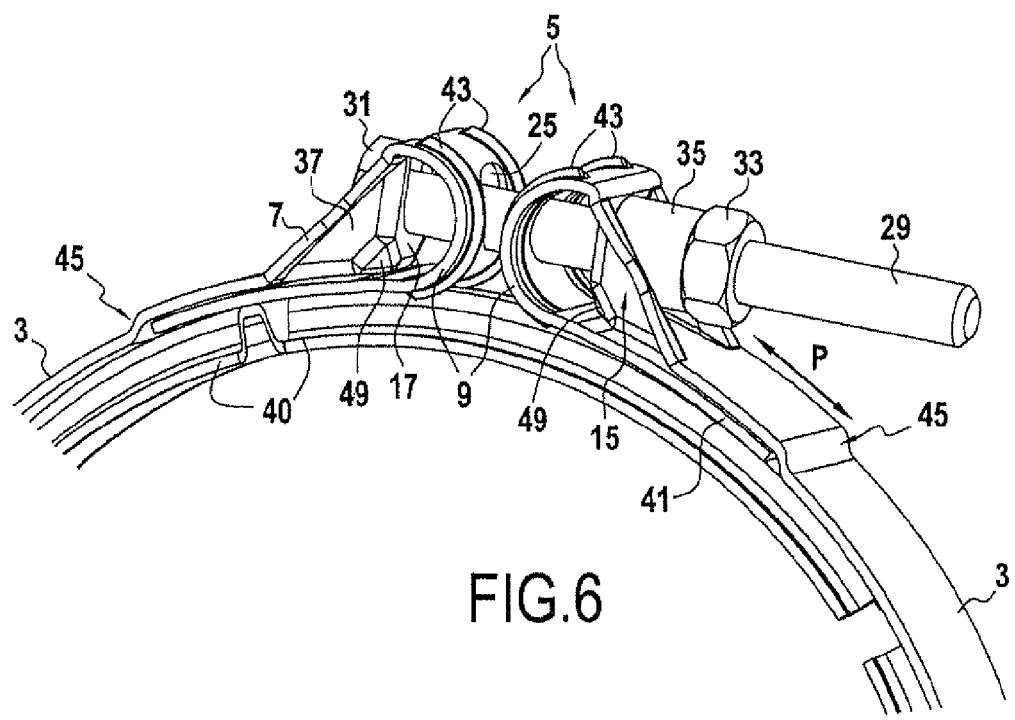

The fourth example of a collar, shown in FIGS. 5 and 6, is such that a belt portion, situated at the end 13 of the loop 5, presents two reinforcing ribs 43 extending circumferentially and situated on the side edges of said belt portion. Said ribs 43 make it possible to reinforce the strength of the loop 5 in order to prevent it from being deformed (flattened) under the action of the tightening means. These ribs 43 are formed by die-stamping the belt.

The pushed-in portion 15 of the collar of FIGS. 5 and 6 is such that it has side walls 37 (like the collar in FIGS. 1 and 2); and such that the tightening wall 17 and the wall 23 define between them an intersection line. In addition, the pushed-in portion 15 has facets 49 in the junction zones between the intersection line and the side walls 37. Said facets 49 are formed while the pushed-in portion 15 is being formed by die-stamping.

The facets 49 make it possible to limit the phenomenon of narrowing, indicated by the arrows B, that is localized in the middle portions of the arms 19, and that takes place during the die-stamping. By means of the facets 49, the quantity of material pushed in at said intersection line is smaller, so that the reduction in the width of the edge segments 19, in register with the intersection line, is also smaller.

Finally, it should be noted that a plurality of segments 40 that are V-shaped and U-shaped in cross-section and whose concave sides face towards the center of the collar are mounted on the inside face of the belt 3 and on the inside face of one of the inner belt portions 9. This makes it possible, for example, to use the collar to connect together end-to-end two tubes having frustoconical ends.

Figure 7:
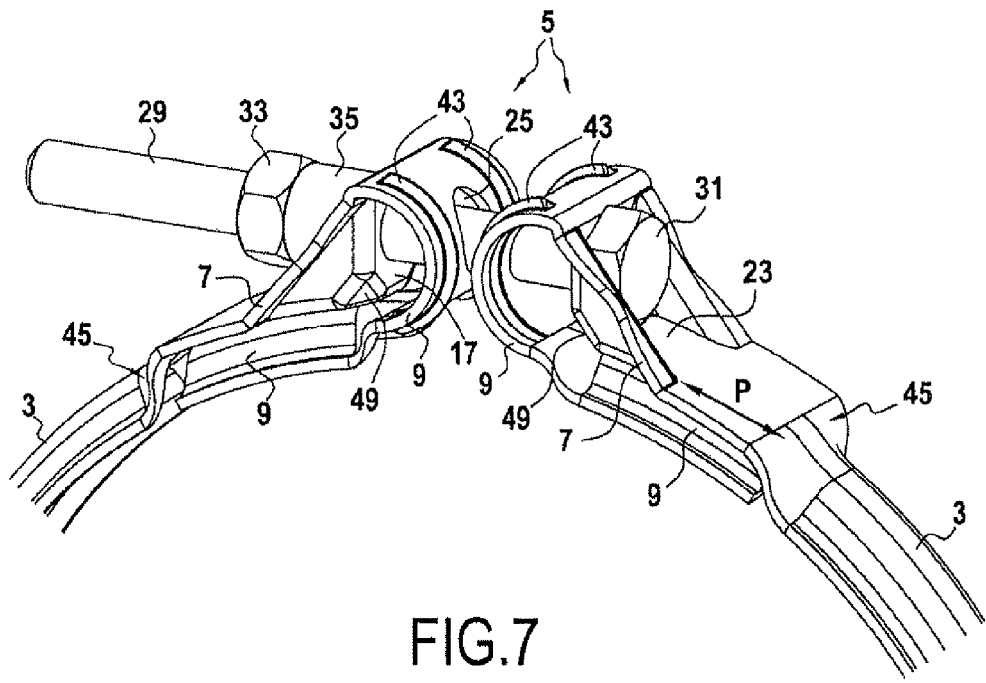
FIG. 7 shows a fifth example of a collar.

The fifth example of a collar shown in FIG. 7 is analogous to the example shown in FIG. 6 except for the sole difference that it does not have any segments mounted on the inside face of the belt 3 because it is the belt itself that is provided with a cross-section that is V-shaped or U-shaped and that has its concave side facing towards the center of the collar. More precisely, only those belt portions that are designed to come into contact with the article to be clamped are provided with such a cross-sectional shape, those belt portions being the portion of the strip 3 that is situated upstream from the shoulders 45 and fractions of the inner belt portions 9.

Figure 8:
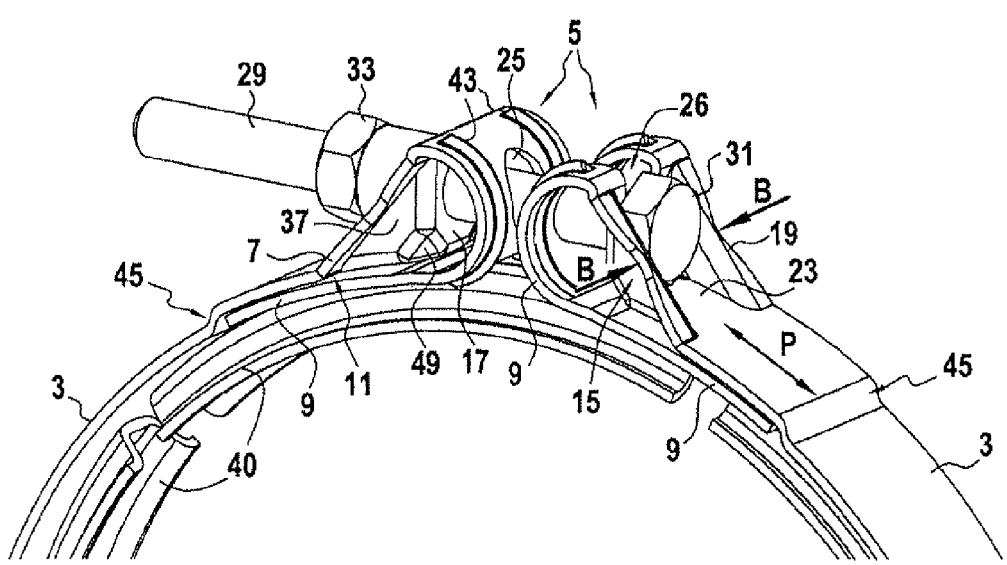
FIG. 8 shows a sixth example of a collar.
Figure 9:
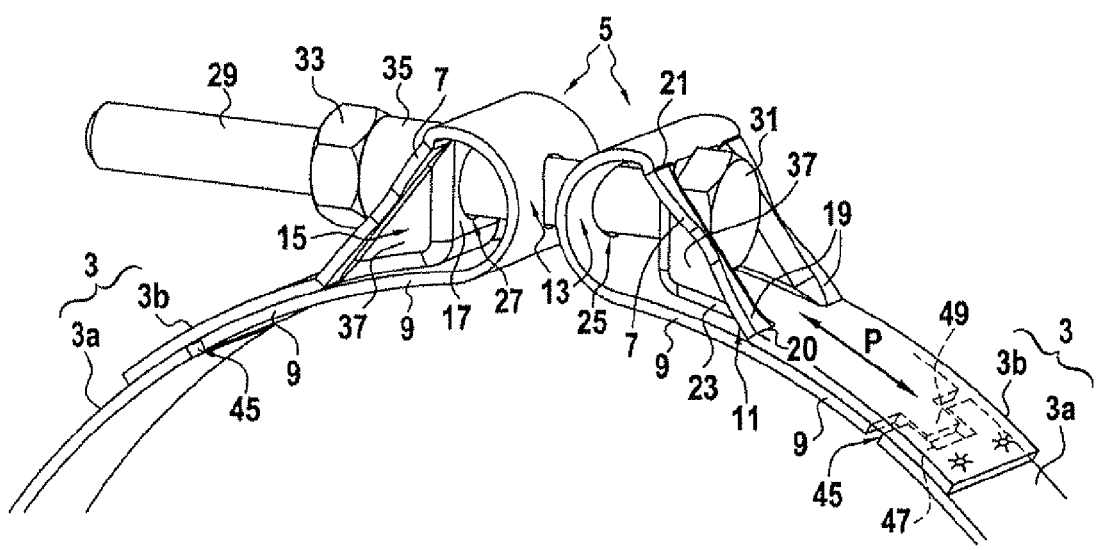
FIG. 9 shows a seventh example of a collar.

The sixth example of a collar that is shown in FIG. 8 is analogous to the collar in FIGS. 4 and 5, except for the sole difference that the openings 25 and 27 of the loop 5 receiving the bolt head 31, are constituted by the same single oblong opening 26 extending from the tightening wall 17 to the end 13 of the loop 5. Naturally, the oblong opening 26 could, by way of an alternative, be formed in the loop 5 receiving the nut 33 or in both loops 5. This makes it easy to open the collar by disengaging the shank 29 of the bolt from the loop(s) 5 in question, and thus makes it easier to place the collar on the article to be clamped.

The seventh example of a collar, shown in FIG. 9, is analogous to the collar of FIG. 3 except for the sole difference that the shoulder 45 is formed differently.

In this example, each loop 5 is formed separately from the remainder of the belt and includes a fastening tab 3B that is extended by said outer belt portion 7 that, in turn, is extended by said inner belt portion 9. The fastening tab 3b is thus upstream from the outer belt portion 7. In addition, the fastening tab 3b covers a fraction of the inner belt portion 9 (over the portion P) and goes therebeyond upstream therefrom. The end of the fastening tab 3b that is situated beyond the inner belt portion 9 is fastened, e.g. by welding, to the outside face of a main strip portion 3a. Once connected together, the fastening tab 3b and the main strip portion 3a form the strip 3 of the collar. A shoulder 45 is thus formed at the end of the main strip portion 3a. The height of said shoulder 45 corresponds to the thickness of the main strip portion 3a.

Advantageously, guide means are provided so as to keep the inner belt portion 9 in alignment with the strip 3. In the example of FIG. 9, said guide means are provided at the shoulder 45 and they comprise a notch 47 provided in the free end of the main strip portion 3a. Said notch 47 co-operates with a projecting portion 49 of complementary shape, formed on the free end of the inner belt portion 9. During the tightening, the projecting portion 49 slides in the notch 47 and the inner belt portion 9 is thereby guided in alignment with the main strip portion 3a. In an alternative, the notch could be provided in the free end of the inner belt portion 9, and the projecting portion could be formed on the free end of the main strip portion 3a.

When the shoulder 45 is formed by deforming (die-stamping) the strip 3, as it is in the examples of FIGS. 1 to 8, the notch 47 is also formed by deforming the strip, advantageously at the same time as the shoulder 45 is being formed.

Other types of guide means can be imagined, in particular hooks that project from the side edges of the inner belt portion 9, which hooks are curved back over the fastening tab 3b.

Finally, it should be noted that the embodiment of the collar of FIG. 9 makes it possible to mass-produce identical loops 5, so as then to fasten them to main strip portions 3a of sizes (i.e. of diameters) that are different and, thus, to obtain belts of different sizes.

The invention claimed is:

1. A clamping collar comprising:
 a) a belt comprising a strip and two free ends, at least one of said ends being curved back to form a loop, said loop being defined by an outer belt portion and by an underlying inner belt portion, said outer belt portion and said inner belt portion being spaced apart from each other to form the loop; and
 b) a tightening system comprising a shank, the tightening system co-operating with said loop so as to tighten said belt;
 wherein said at least one free end forming the loop is curved back towards an inside of the collar, wherein said inner belt portion is extended beyond the loop, under said strip, and wherein said outer belt portion delimiting the loop defines a tightening wall with which the tightening system comes into engagement, said loop having a first opening provided in the tightening wall and a second opening aligned with the first opening, the first and second openings being spaced apart from each other, and the shank of the tightening system being engaged in said openings and passing through said loop, whereby the forces exerted by the tightening system are exerted on the outer belt portion of the loop, via an outside of the loop.

2. The clamping collar according to claim 1, wherein each of the two free ends of said belt are curved back in such a manner as to form a loop, and wherein said tightening system makes it possible to bring said loops closer together so as to tighten said belt.

3. The clamping collar according to claim 1, wherein said inner belt portion is not fastened under said strip.

4. The clamping collar according to claim 3, further comprising an abutment for preventing the inner belt portion from moving along the strip while the collar is being tightened.

5. The clamping collar according to claim 4, wherein said strip has a shoulder against which said inner belt portion comes into abutment, while the collar is being tightened.

6. The clamping collar according to claim 5, wherein the height of said shoulder is at least substantially equal to the thickness of said inner belt portion.

7. The clamping collar according to claim 5, further comprising guide means for keeping the inner belt portion aligned with the strip.

8. The clamping collar according to claim 1, wherein the outer belt portion presents a pushed-in portion, set back relative to the outer outline of the loop, which pushed-in portion defines said tightening wall.

9. The clamping collar according to claim 8, wherein the pushed-in portion is flanked on either side by respective ones of two edge segments of the outer belt portion.

10. The clamping collar according to claim 1, having a section that is generally circular in shape, and wherein the tightening wall extends substantially radially.

11. The clamping collar according to claim 1, wherein the tightening system comprises a nut-and-bolt assembly having the shank of its bolt passing through said loop, the bolt head or the nut coming respectively into engagement directly or via a spacer against the tightening wall of the loop.

* * * * *